June 29, 1937.　　　H. G. EVITT　　　2,085,493
CAKE CONTAINER
Filed Jan. 9, 1936
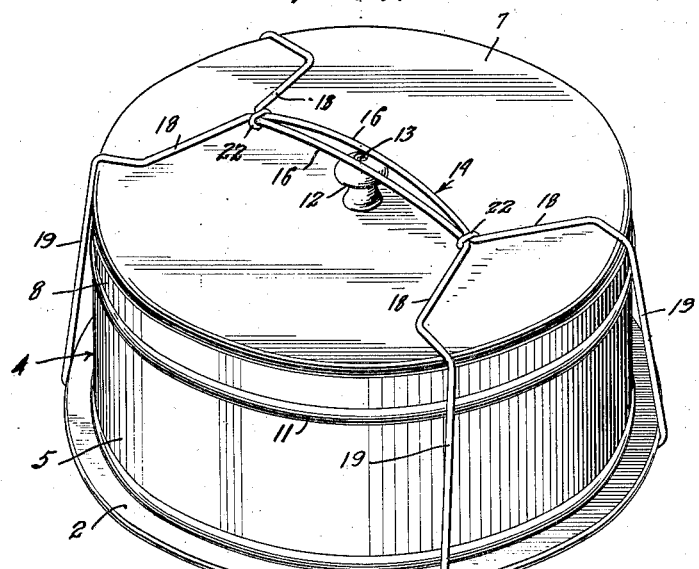
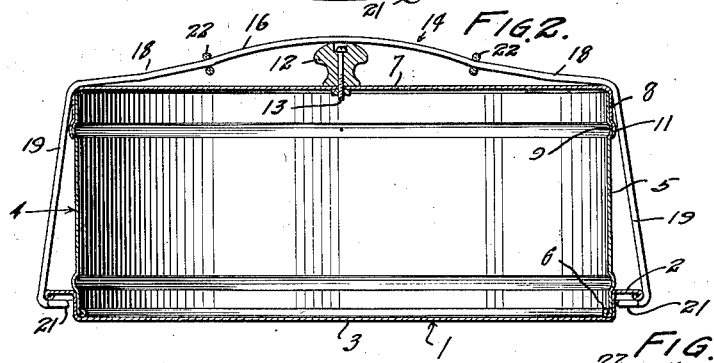
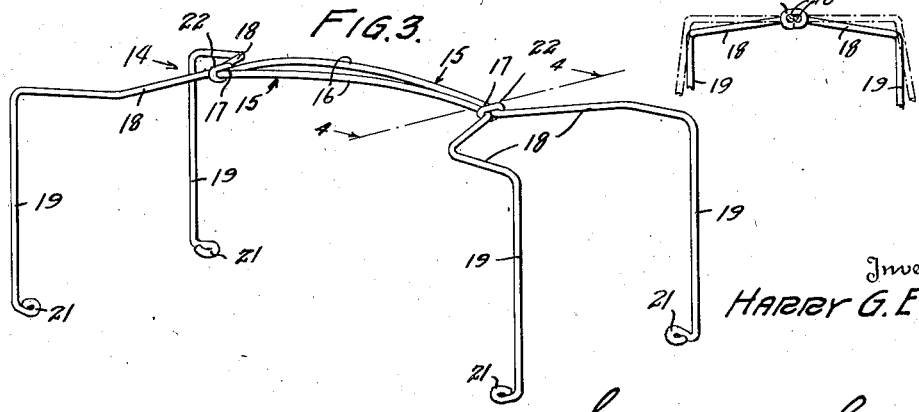
Inventor
HARRY G. EVITT
By Semmes & Semmes
Attorneys Patented June 29, 1937

2,085,493

UNITED STATES PATENT OFFICE 2,085,493

CAKE CONTAINER

Harry G. Evitt, Baltimore, Md., assignor to The Parker Metal Decorating Company, Inc., Baltimore, Md., a corporation of Maryland Application January 9, 1936, Serial No. 58,373

4 Claims. (Cl. 220—1)

This invention relates to containers, and more particularly has reference to a cake box which may be assembled as a unit, or which may be disassembled to provide a tray for the contents.

While it is true that there have been previous cake boxes of the same general construction as mine, there has been some difficulty experienced in the handle for securing the top to the base of the box. These handles have been of one-piece construction, and have been assembled on the top and base only by the resiliency inherent in such handles.

I have found, however, that by making up the handle from two pieces and suitably joining the same to permit a limited relative movement of the two pieces, a handle of improved construction is secured. Such type of handle has the advantages inhering in the former handles, and has the further advantage of ease in assembly of the complete box and in removing the handle from the top and base.

An object of this invention is to overcome the disadvantages residing in previous types of cake boxes.

Another object of this invention is to provide a cake box formed of a base and cover member and provided with means for securing the same together, said means also serving as a handle for the assembled unit.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a perspective view of an assembled cake box constructed in accordance with my invention.

Figure 2 is a vertical sectional view.

Figure 3 is a perspective view of the handle.

Figure 4 is a sectional view along the line 4—4 of Figure 3.

Referring more specifically to the drawing, my improved box is made up of a base member or tray 1. As best shown in Figure 2, this base member is provided with a raised peripheral lip 2, to thereby form a round well 3 in the tray.

The cover, designated generally as 4, is provided with a side wall 5 which is adapted to fit snugly within the well 3 of the base member. An inwardly rolled bead 6 may be provided at the base of the side wall 5 to afford additional strength and rigidity to the wall.

The top 7 of the cover is preferably formed of a separate piece of metal which is suitably secured to the wall 5 by brazing, welding or tight frictional fit. As shown in Figure 2, the top 7 may be provided with a depending peripheral flange 8 which fits snugly over the upper end of the wall 5. A bulge 9 may be formed on the side wall which is adapted to cooperate with a bulge 11 on the flange 8 to insure a tight seating of the top on the side wall.

A suitable knob 12 may be mounted centrally on the top 7 by means of a bolt and screw arrangement 13 or any other suitable fastening means.

Referring to Figure 1, it will be noted that the handle 14 is adapted to secure the top 4 to the tray 1. As best shown in Figure 3, the handle is made up of separate members 15. Each of these members is provided with a central portion 16 which lies over the center of the cover. The ends of the central portion 16 lie adjacent one another, but are slightly bowed away from each other intermediate the ends 17, as best shown in Figure 1. Beyond the ends 17, the members 15 are bent in substantially opposite directions to form sections 18, and are then bent downwardly to form depending arms 19. At the base of each arm 19 there is an inwardly turned and curled section 21 which is adapted to engage the under surface of peripheral lip 2.

At each end 17 of the central portions 16, I provide a band 22 which is adapted to secure the two members 15 together. However, the bands 22 permit of a limited and relative oscillation of the two members. This limited oscillation makes for greater ease in securing the handle 14 on the assembled base and cover, as well as in removing the handle from the assembled box. For instance, in arranging the handle on the assembled box, one of the members 15 may be moved laterally into position, while the opposite member is in a relatively raised position. When the opposite member is swung downwardly, the amount of flexure is minimized over what would be necessary if the two pieces were rigidly secured to each other. As best shown in Figure 2, the handle 14 serves to effectively retain the cover in the seated position on the base 1, for it will be observed that the handle engages the periphery of the top of the cover and also grasps the under free edge of the lip 2.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a container comprising a tray and a cover therefor, a handle to secure the cover to the tray comprising two independent yoke members extending across the top of the cover and having ends engaging the under side of the tray at opposite sides thereof, and pivotal means joining the two members and permitting limited oscillation of said members with respect to each other.

2. A container comprising a tray, a cover therefor, and a handle adapted to secure the cover to the tray, said handle being formed of two independent yoke members, each of which passes completely over the top of the cover and engages the underside of the tray at opposite sides thereof, and a ring passing around the handle members at a point above the cover, said ring adapted to permit limited oscillation of the members relative to each other.

3. A container comprising a disk-like tray, a cover therefor, and a handle adapted to secure the cover to the tray, said handle being formed of two independent yoke members passing substantially radially over the top of the cover and engaging the underside of the tray at opposite sides thereof, and rings passing around the handle members at a plurality of points above the cover and spaced radially from the center, said rings adapted to permit limited oscillation of the members relative to each other.

4. A container comprising a disk-like tray member, a circular cover therefor, and a handle adapted to secure the cover to the tray, said handle being formed of two yoke-like pieces passing completely over the top of the cover and engaging the underside of the tray member at opposite sides thereof, each of said pieces being provided with a section juxtaposed to the corresponding section of the other piece, and rings passing around said portions adjacent their ends, said rings adapted to join the two pieces but to permit limited oscillation of the said pieces with respect to each other.

HARRY G. EVITT.